US009429461B2

(12) United States Patent
Gebhardt et al.

(10) Patent No.: US 9,429,461 B2
(45) Date of Patent: Aug. 30, 2016

(54) METHOD AND DEVICE FOR CAPACITIVE FILL LEVEL MEASUREMENT OF LIQUIDS OR BULK MATERIALS

(71) Applicant: Rechner Industrie-Elektronik GmbH, Lampertheim (DE)

(72) Inventors: Stefan Gebhardt, Lampertheim (DE); Armin Kohler, Lampertheim (DE); Martin Suenkeler, Proseken (DE); Thorsten Koob, Lorsch (DE); Eduard Bischler, Lampertheim (DE)

(73) Assignee: Rechner Industrie-Elektronik GmbH, Lampertheim (DE)

( * ) Notice: Subject to any disclaimer, the term of this patent is extended or adjusted under 35 U.S.C. 154(b) by 198 days.

(21) Appl. No.: 14/162,441

(22) Filed: Jan. 23, 2014

(65) Prior Publication Data

US 2014/0208846 A1    Jul. 31, 2014

(30) Foreign Application Priority Data

Jan. 29, 2013 (EP) .................................... 13000429

(51) Int. Cl.
*G01F 23/26* (2006.01)

(52) U.S. Cl.
CPC ........... *G01F 23/263* (2013.01); *G01F 23/266* (2013.01); *G01F 23/268* (2013.01)

(58) Field of Classification Search
CPC ... G01F 23/263; G01F 23/266; G01F 23/268
USPC ..................................................... 73/304 C
See application file for complete search history.

(56) References Cited

U.S. PATENT DOCUMENTS

| 4,142,415 A | 3/1979 | Jung et al. |
| 6,178,818 B1 | 1/2001 | Plochinger |
| 2005/0172712 A1* | 8/2005 | Nyce ..................... G01F 23/268 73/304 C |

FOREIGN PATENT DOCUMENTS

GB            792484 A        3/1958

OTHER PUBLICATIONS

"Related EP Patent Application No. EP 13 000 429.4 Search Report", Jul. 31, 2013, Publisher: EPO, Published in: EP.

* cited by examiner

*Primary Examiner* — Daniel S Larkin
*Assistant Examiner* — Irving A Campbell
(74) *Attorney, Agent, or Firm* — Kaplan Breyer Schwarz & Ottesen, LLP (57) ABSTRACT

A method for capacitive fill level measurement of liquids and/or bulk materials in a container using at least one measuring sensor that is connected to a measuring electronics, wherein the measuring sensor is constructed from a plurality of, at least three, electrodes which are electrically insulated from one another and which, for measuring the fill level, are inserted into the container, and in the inserted state extend into the container, and wherein these at least three electrodes are connected to the measuring electronics and are operated in at least one first or in at least one second measuring mode. The invention further relates to a device for capacitive fill level measurement of liquids and/or bulk materials in a container.

11 Claims, 6 Drawing Sheets

METHOD AND DEVICE FOR CAPACITIVE FILL LEVEL MEASUREMENT OF LIQUIDS OR BULK MATERIALS

CROSS-REFERENCE TO RELATED APPLICATIONS

European Patent Application No. 13 000 429.4, with a filing date of Jan. 29, 2013, is incorporated herein by reference.

FIELD OF THE INVENTION

The invention relates to a method and a device for capacitive fill level measurement of liquids and/or bulk materials in a container using at least one measuring sensor that is connected to a measuring electronics.

BACKGROUND OF THE INVENTION

Due to their robustness, capacitive fill level measurements are used in many technical fields.

Here, the dominant principle is that a conductive rod or a conductive rope or cable functioning as an electrode is arranged insulated in a conductive container. The container wall and the electrode form a capacitor arrangement. The electric field of this capacitor arrangement thus fills the entire container volume. If this container volume is filled with a dielectrically acting material, the capacitance value of this capacitor arrangement is changed.

Since all technical products have a higher dielectric action with respect to air, which is designated as permittivity, the capacitance value is continuously increased when filling the container, in particular in the case of a positionally stable, substantially vertical mounting in the container and a suitable embodiment of the rods or cables or ropes, which are designated as probes or measuring sensors, and which electrically represent an electrode of the capacitor arrangement with respect to the container wall as the second electrode. The capacitance change between the empty state and the different fill states is detected by suitable electronic measuring electronics and converted into the desired analogue or switching output signals.

An electronic evaluation of the electrical primary signals obtained by means of capacitive measuring sensors is known from DE 1275777, for example.

Although usually fill level measurements are spoken of, at least one indication about the volume or the mass of the material in the container is desired. If there is a linear correlation between the fill height and the volume increase, this indication can be readily provided since only one constant factor is to be taken into account.

For this, the following requirements are to be met: The cross-section of the container remains constant over the height and the fill level measurement delivers reproducible results. As already described, the signal of the fill level measurement is determined through a comparison of the corresponding capacitance value of the respective current fill level with the capacitance value of the empty state.

However, many materials cause adhesions both on the container and the measuring sensors due to electrostatics or high viscosities, for example. Since adhesiveness is influenced by material change, different process parameters such as temperature, humidity and/or grain size, the comparative value of the "empty" container often can no longer be considered as being constant. In the case of unfavorable container geometries, this can result in uselessness of the measurement.

This problem can partially be alleviated by detecting the comparative value "empty container", that is to be determined through calibration in a real situation, thus by using typical material approaches. However, with the dependencies mentioned above, this requires frequent corrections of the calibration during changing conditions.

The container geometry that is ideal for a meaningful fill level measurement effects a linear capacitance increase over the fill height. For practice, this is always provided to a sufficient extent if at constant container cross-section, the ratio between height and diameter of the container is high. A cylindrical capacitor in the interior of which the electrical field provides these requirements in an ideal manner can be viewed as an example for this. However, at the ends of the cylindrical capacitor there are "boundary distortions" of the electrical fields which result in more or less significant nonlinearities.

For many container shapes used in practice, a quantitative assessment about the influence of boundary distortions on the linearity of the fill level measurements is hardly possible. Specifically in the case of the frequent request to implement the fill level range at a maximum from the bottom up to the upper edge, no theoretical prediction is possible and much less, a calculation of the linearity error is possible.

Besides the previously described principle of a capacitor formed from a conductive container wall and a probe that is insulated with respect thereto, furthermore, another version is known in which 2 electrodes are arranged in the container at a constant distance from one another and insulated with respect to one another. For instance, for measurements in low-viscosity liquids in the container interior or as a bypass, a slim tube (measuring tube) with a centrically arranged inner electrode is used as a measuring arrangement. This arrangement corresponds to the above-described cylindrical capacitor that has a high ratio between height and diameter. Changes in the cross-section of the container thus have no influence on the measuring signal.

However, this principle cannot be used for high-viscosity liquids and bulk materials since no identical fill level in the container and the measuring tube can be guaranteed.

This problem can also be solved with another variant in the form of electrodes that are arranged in parallel. Here, two electrodes in the form of wires or strips that are insulated from one another are used. However, since in this case the electrical field concentrates primarily between these parallel electrodes, and the material to be detected is detected only to a small extent by this measuring field, such an arrangement leads to unsatisfactory results.

This situation can be improved by providing shielding between the electrodes so that a measuring field can form in the outer region of the electrodes arranged in parallel.

Numerous variants for specific configurations of such a shielding are known, both for mechanical implementation in the measuring sensors and for obtaining a suitable shielding potential within the measuring electronics.

In terms of their measuring behavior, the measuring arrangements described last thus are largely independent of container geometries if a minimum distance is maintained between a measuring sensor and the container wall. This distance should be dimensioned such that the measuring field at the wall comprises only a negligible portion of the total field. This requirement corresponds to the natural aim of establishing a sufficient distance between the wall and the sensor so as to prevent material bridging. The disadvantage of measuring sensors having parallel electrodes is however the strong dependency on material adhesions on the sensor surface since the field portion of the measuring field is greatest directly on the surface.

The few above-mentioned dependencies already show that the requirements for implementing a specific fill level measurement are very complex. In practice, a measurement arrangement is in most cases selected by the user; however, the interrelations of primary signal recovery by the electrical measuring field are not taken into account or are insufficiently taken into account. This, specifically if no professional advice is provided, often results in malfunctions which are attributed to the measuring electronics, but in fact are caused by the wrong selection of the measuring arrangement.

If a malfunction is detected when starting a capacitive measurement, the entire measuring arrangement of the current prior art has to be replaced. In most cases, this involves high expenditures in terms of time and costs.

SUMMARY OF THE INVENTION

It is an object of the invention to provide an improved capacitive measuring method and an improved capacitive measuring device for determining fill levels in containers for a multiplicity of different metrological requirements with respect to container types and geometries as well as different characteristics of filling materials to be filled therein, which ensure adjustments and/or modifications to these metrological requirements in a significantly simpler manner, and in particular also enable in a simple manner replacing of, switching between, and/or integrating usable or used electrodes, in particular also for the purpose of being able to be adapted as flexible as possible to the special requirements, such as construction, design and material of tanks or containers of any kind.

Moreover, it shall advantageously be possible that calibration work can be carried out in a simple manner, even by untrained persons. Furthermore, the invention shall in particular enable a method and a device for continuously and capacitively measuring the fill level in containers.

For this, the invention proposes solutions to the problem which are represented by the subject matters with the features of the attached independent claims.

Advantageous configurations and refinements are subject matter of the dependent claims.

Accordingly, the invention proposes a method for capacitive fill level measurement of liquids and/or bulk materials in a container using at least one measuring sensor that is connected to a measuring electronics, wherein the measuring sensor is constructed from a plurality of, at least three, electrodes which are electrically insulated from one another and which, for measuring the fill level in the container, are inserted in particular substantially vertically into the container, and in the inserted state therefore extend in particular substantially vertically in the container.

According to the invention, these at least three electrodes are connected to the measuring electronics or are operated in at least one first or in at least one second measuring mode.

In the first measuring mode, in each case different potentials are applied to the at least three electrodes of the measuring sensor, wherein a first potential is applied to a first electrode, a second potential that is different with respect to the first potential is applied to a second electrode, and the second electrode is operated as counter electrode to the first electrode, and a third potential that is different with respect to the first and second potentials is applied to the third electrode, and the third electrode is operated as a guard electrode.

In the second measuring mode, a first potential is applied to at least one of the at least three electrodes of the measuring sensor, and at least one second potential that is different with respect to the first potential is applied to an electrically conductive container wall, wherein the measuring electronics and the electrically conductive container wall are galvanically connected to one another, and the electrically conductive container wall is operated as counter electrode to the at least one electrode of the measuring sensor to which the first potential is applied.

As an alternative in the second measuring mode, in particular in the case of non-conductive containers, a second potential that is different with respect to the first potential is applied to an auxiliary electrode that is arranged separate from the measuring sensor within the container or on the outside on the container wall, wherein the measuring electronics and the auxiliary electronics are galvanically connected to one another, and the auxiliary electrode is operated as counter electrode to the at least one electrode of the measuring sensor to which electrode the first potential is applied.

In a preferred embodiment of the invention, a method according to the invention for capacitive fill level measurement is optionally operated either in the first or in the second measuring mode, in particular by switching the measuring electronics to the first or the second measuring mode. Such a selection of one of the at least two measuring modes takes place by switching between the at least two measuring modes either by using different measuring sensors, by changing the measuring sensor contact at the measuring electronics or by a switching mechanism which is in particular formed as part of the measuring electronics.

In another embodiment of the method according to the invention, the same potential is optionally applied to one or to a plurality of the electrodes of the measuring sensor.

Consequently, a measurement using the method according to the invention can take place both in conductive and in non-conductive containers. Moreover, the method according to the invention enables to take account of metrological influences such as container type and geometry, adhesion properties of materials on the container wall and on the measuring sensor and, furthermore, to take account of material characteristics, and to exclude or at least minimize such influences.

In a further configuration of the method according to the invention for capacitive fill level measurement, optionally one or more additional identical or different measuring sensors are inserted into the container, connected to the measuring electronics and operated.

In another embodiment of the method according to the invention, in the case of the second measuring mode, the measuring field is aligned for at least one of the at least three electrodes (5, 5', 5", 5"', 5"") of the measuring sensor (8) by a one-sided shielding in the form of a plurality of electrodes that are operated as guard electrodes (9).

Moreover, the invention proposes a device for capacitive fill level measurement of liquids and/or bulk materials in a container using at least one measuring sensor that can be connected to the measuring electronics, wherein the measuring electronics provides at least three different potentials and the measuring sensor is formed from a plurality of, at least three, electrodes which are electrically insulated from one another and which, for measuring the fill level in the container, are to be inserted in particular substantially vertically into the container, and in the inserted state therefore extend in particular substantially vertically in the container.

The method according to the invention can be operated in at least one first or in at least one second measuring mode, wherein for this purpose, at least three electrodes can be connected to the measuring electronics.

In the first measuring mode, the in each case three different potentials can be applied to the at least three electrodes of the measuring sensor of the device according to the invention, wherein a first potential can be applied to the first electrode, a second potential that is different with respect to the first potential can be applied to a second electrode so as to operate the second electrode as a counter electrode to the first electrode, and a third potential that is different with respect to the first and the second potentials can be applied to the third electrode so as to operate the third electrode as a guard electrode.

In the second measuring mode, a first potential can be applied to one of the at least three electrodes of the measuring sensor, and at least one second potential that is different with respect to the first potential can be applied to an electrically conductive container wall of the container, wherein the measuring electronics and the electrically conductive container wall are galvanically connected to one another so as to operate the electrically conductive container wall as a counter electrode to the at least one electrode of the measuring sensor to which the first potential is applied.

As an alternative in the second measuring mode, preferably in the case of a non-conductive container, a second potential can be applied to an auxiliary electrode that is arranged separate from the measuring sensor within the container or on the outside on the container wall, wherein the measuring electronics and the auxiliary electrode are galvanically connected to one another so as to operate the auxiliary electrode as a counter electrode to the at least one electrode of the measuring sensor to which the first potential is applied. In a preferred embodiment, the device according to the invention for capacitive fill level measurement is designed to be optionally operated either in the first or in the second measuring mode.

Such a selection between the at least two measuring modes is preferably enabled in that the device can be switched between the at least two measuring modes either by using different measuring sensors, by changing the measuring sensor contact at the measuring electronics, or by a switching mechanism which is in particular formed as part of the measuring electronics.

In a particularly preferred embodiment, the device according to the invention is designed to apply the same potential optionally to one or to a plurality of the electrodes of the measuring sensor and in particular to optionally connect the conductive container or the auxiliary electrode to the electronics, or to disconnect the connection.

The device according to the invention is in particular characterized in that the electrodes of the measuring sensor can be formed to be rigid, flexible, wire-shaped or strip-shaped, and/or the electrodes of the measuring sensor are formed in a mechanical bond and/or that in particular customary multi-core cables can be used as measuring sensors.

Furthermore, in a preferred embodiment of the device according to the invention, the electrodes of the measuring sensor are led parallel to one another in the container or have constant distances between one another at least in certain sections.

In another configuration of the device according to the invention for capacitive fill level measurement it is provided that, in addition to the measuring sensor, optionally one or more further identical or different measuring sensors can be inserted into the container, connected to the measuring electronics and operated.

In another configuration of the device according to the invention, the electrodes arranged in the measuring sensors form a bond together with insulation materials which, during the fill level measurement of liquids and/or bulk materials, are chemically resistant to said liquids and/or bulk materials, and/or ensure abrasion resistance and tensile strength. Furthermore, one preferred embodiment of a device according to the invention for capacitive fill level measurement is designed so as to enable the recovery of at least one limit value switching signal, at least one analogue fill level signal, or, at the same time, a combination of analogue fill level signals and limit value signals.

The method according to the invention and the device according to the invention furthermore allow the use of flexible or rigid measuring sensors which preferably can also be attached to flexible or rigid bodies and are integrated in particular in electrically insulating bodies such as probe sleeves or guide rails, and are led, for example, on or inside of insulation bodies such as, e.g., plastic tubes or plastic holders.

The invention is described in more detail below by means of some preferred, but merely exemplary embodiments, and with reference to the accompanying drawings.

BRIEF DESCRIPTION OF THE DRAWINGS

In the figures.

Preferred embodiments within the context of the invention are described below with reference to the drawings, wherein the same components or components having the same effect are at least partially designated by the same reference numbers.

DETAILED DESCRIPTION

FIGS. 1 to 5*b* schematically show different embodiments of the invention for operating a device according to the invention in different measuring modes for carrying out preferred methods according to the invention for capacitive fill level measurement of liquids and/or bulk materials in a container 2 using at least one measuring sensor 8 that is connected to a measuring electronics 1, wherein the measuring sensor 8 is constructed from a plurality of, at least three, electrodes 5, 5', 5", 5''', 5'''' that are electrically insulated from one another. For measuring the fill level in the container 2 according to the FIGS. 1 to 5*b*, the measuring sensor 8 with the at least three electrodes 5, 5', 5", 5''', 5'''' that are electrically insulated from one another is inserted into the container 2 and extends in the inserted state in the container 2. The measuring sensor 8 is connected to the measuring electronics 1 and can then be operated in at least one first or in at least one second measuring mode.

The device according to the invention is designed in such a manner that in a first measuring mode, as shown, e.g., in the FIGS. 1, 3*a*, 4*a* and 5*a*, in each case different potentials are applied to the at least three electrodes 5, 5', 5", 5''', 5'''' of the measuring sensor 8, wherein a first potential is applied to the first electrode 5, and this first electrode 5 therefore is operated as measuring electrode 10. A second potential that is different with respect to the first potential is applied to a second electrode 5', and this second electrode 5' is therefore operated as counter electrode 4 to the measuring electrode 10. A third potential 9 that is different with respect to the first and the second potentials is applied to the third electrode 5", wherein the third electrode 5", 5''', 5'''' therefore is operated as a guard electrode 9.

The device according to the invention, at least alternatively, but, according to a preferred embodiment, is furthermore additionally designed in such a manner that in a second measuring mode, as shown, e.g., in the FIGS. 2*a*, 2*b*, 3*b*, 4*b* and 5*b*, a first potential is applied to at least one, but preferably to all of the at least three electrodes 5, 5', 5", 5''', 5'''' of the measuring sensor 8, and at least one second potential that is different with respect to the first potential is applied to an electrically conductive container wall of the container 2, as shown in the FIGS. 2*a*, 3*b*, 4*b* and 5*b*, wherein the measuring electronics 1 and the electrically conductive container wall of the container 2 will be or are galvanically connected 3 to one another so as to then operate the electrically conductive container 2 as counter electrode to the electrodes 5, 5', 5", 5''', 5'''' of the measuring sensor 8, to which electrodes the first potential is applied.

Figure 2A:
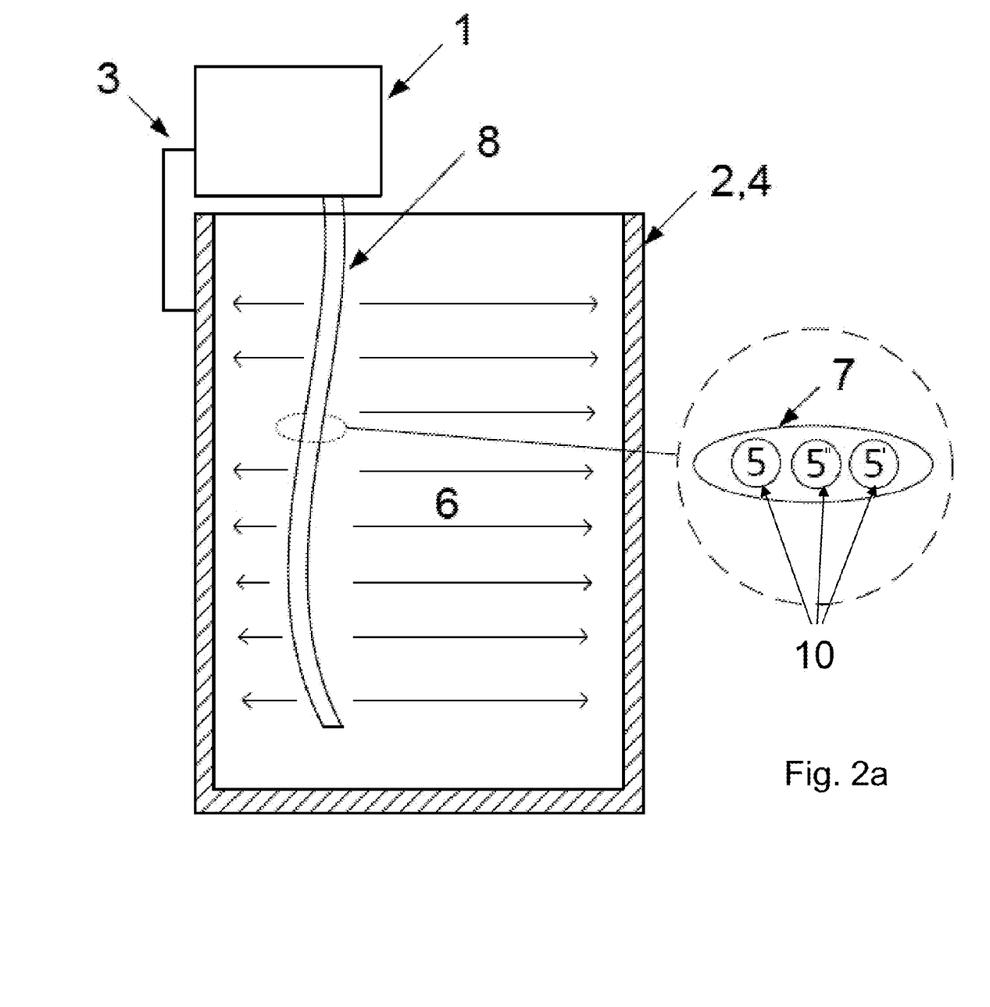
FIG. 2a shows a schematic cross-section through a container, the fill level of which with liquids or bulk materials is determined, according to one embodiment of the invention, in a second measuring mode, wherein the container has a conductive container wall and there is a galvanic connection between the measuring electronics and the conductive container wall so as to operate the container wall as a counter electrode.
Figure 2B:
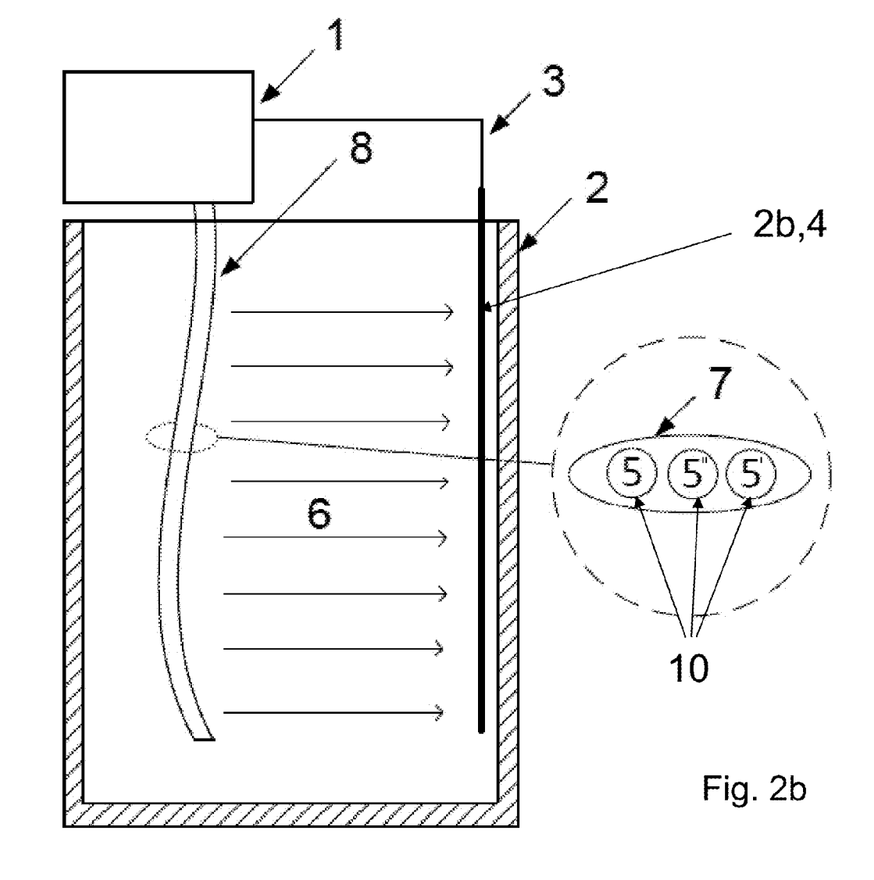
FIG. 2b shows a schematic cross-section through a container, the fill level of which is determined, according to one embodiment of the invention, in the second measuring mode, wherein the container is not conductive, but there is a electrode that is arranged in particular on the container wall so as to operate the auxiliary electrode as a counter electrode, FIG. 3a, b show schematic cross-sections through a conductive container wall and through a measuring sensor formed as a 3-core cable probe according to one embodiment of the invention for illustrating a first measuring mode without a galvanic connection between the measuring electronics and the container wall
(a), and a second measuring mode with a galvanic connection between the measuring electronics and the container wall (b), FIG. 4a, b show schematic cross-sections through a conductive container wall and through a measuring sensor formed as a 4-core cable probe according to another embodiment of the invention for illustrating a first measuring mode without a galvanic connection between the measuring electronics and the container wall (a), and a second measuring mode with a galvanic connection between the measuring electronics and the container wall (b), FIG. 5a, b show schematic cross-sections through a container wall and through a measuring sensor formed as a 5-core cable probe according to another embodiment of the invention for illustrating a first measuring mode without a galvanic connection between the measuring electronics and the container wall (a), and a second measuring mode with a galvanic connection between the measuring electronics and the container wall (b).

Alternatively to operating the second measuring mode in this manner, it is possible, as shown, e.g., in the FIG. 2*b*, to apply a second potential that is different with respect to the first potential to an auxiliary electrode 2*b* that is arranged, separate from the measuring sensor 8, within the container 2 or on the outside on the container wall, wherein the measuring electronics 1 and the auxiliary electronics 2*b* are then galvanically connected 3 to one another, and the auxiliary electrode 2*b* is operated as counter electrode 4 to the electrodes 5, 5', 5", 5''', 5'''' of the measuring sensor 8, to which electrodes the first potential is applied.

Accordingly, the measuring electronics 1 is designed so as to provide at least three different potentials, and the device according to the invention can be operated in at least one first or in at least one second measuring mode, wherein for this purpose, these at least three electrodes 5, 5', 5", 5''', 5'''' are to be connected to the measuring electronics 1, and thereupon can be operated in the above-described first or second measuring mode.

In a preferred embodiment of the method according to the invention for capacitive fill level measurement, a fill level measurement is optionally operated either in the first measuring mode, as shown in the FIGS. 1, 3*a*, 4*a* and 5*a*, or in the second measuring mode, as shown in the FIGS. 2*a*, 2*b*, 3*b*, 4*b* and 5*b*.

A preferred embodiment of a device according to the invention for capacitive fill level measurement is accordingly designed to optionally be operated either in the first measuring mode, as shown in the FIGS. 1, 3*a*, 4*a* and 5*a*, or in the second measuring mode, as shown in the FIGS. 2*a*, 2*b*, 3*b*, 4*b* and 5*b*.

Such a selection of one of the at least two measuring modes takes place according to advantageous refinements of the device in that it is possible to switch between the two measuring modes either by using different measuring sensors 8, by changing the measuring sensor contact at the measuring electronics 1, which is not shown in detail in the Figures, or by a switching mechanism (not shown in the Figures), which is formed in particular as part of the measuring electronics 1.

Figure 4A:
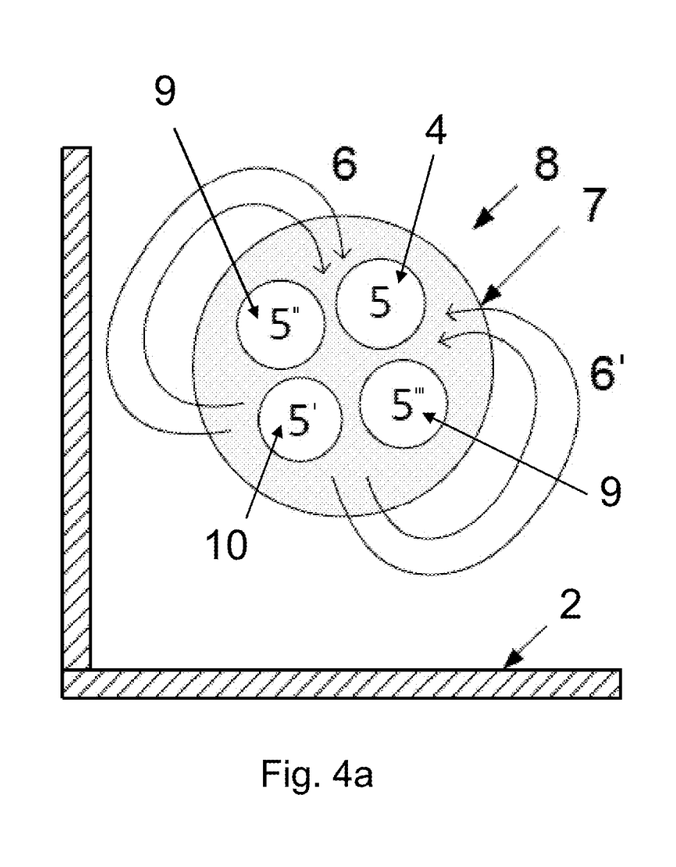
Figure 4B:
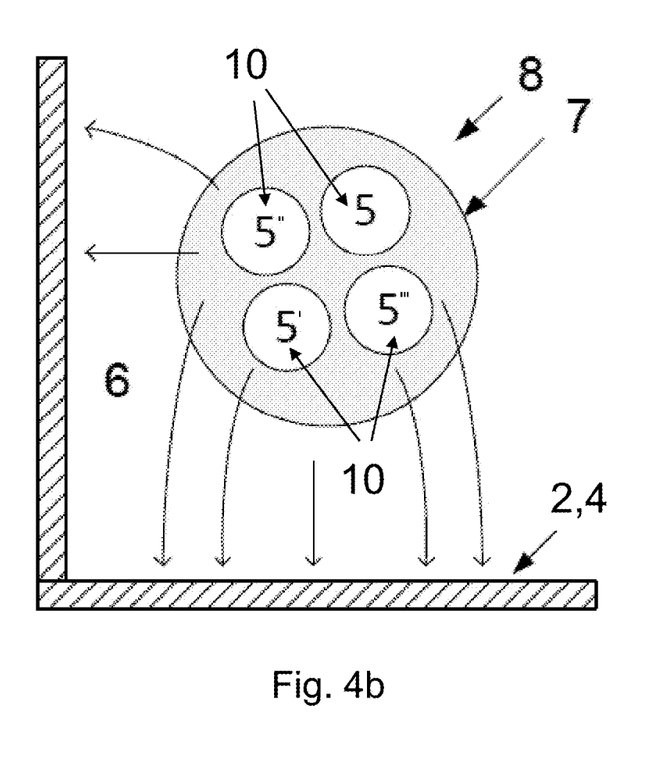
Figure 5A:
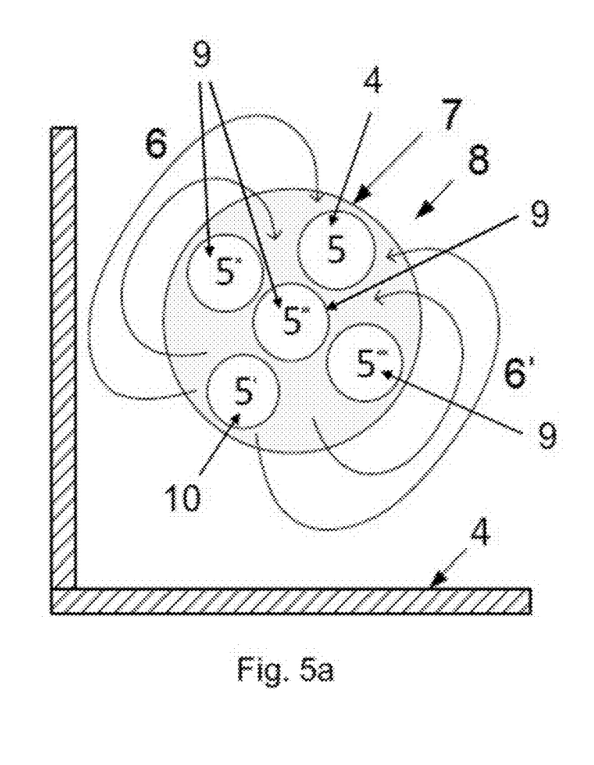

In a preferred embodiment of the method according to the invention for capacitive fill level measurement, the same potential 9 is applied to one or more of the electrodes 5, 5', 5", 5''', 5'''' of the measuring sensor 8, for example to the electrodes 5" and 5''', as in the FIG. 4, or to the electrodes 5" and 5''' and 5'''', as in the FIG. 5*a*. A preferred embodiment of a device according to the invention for capacitive fill level measurement is designed correspondingly for this purpose.

Hereinafter, further preferred embodiments and refinements of the method according to the invention and the device according to the invention are described in detail with reference to the FIGS. 1 to 5*b*.

Figure 1:
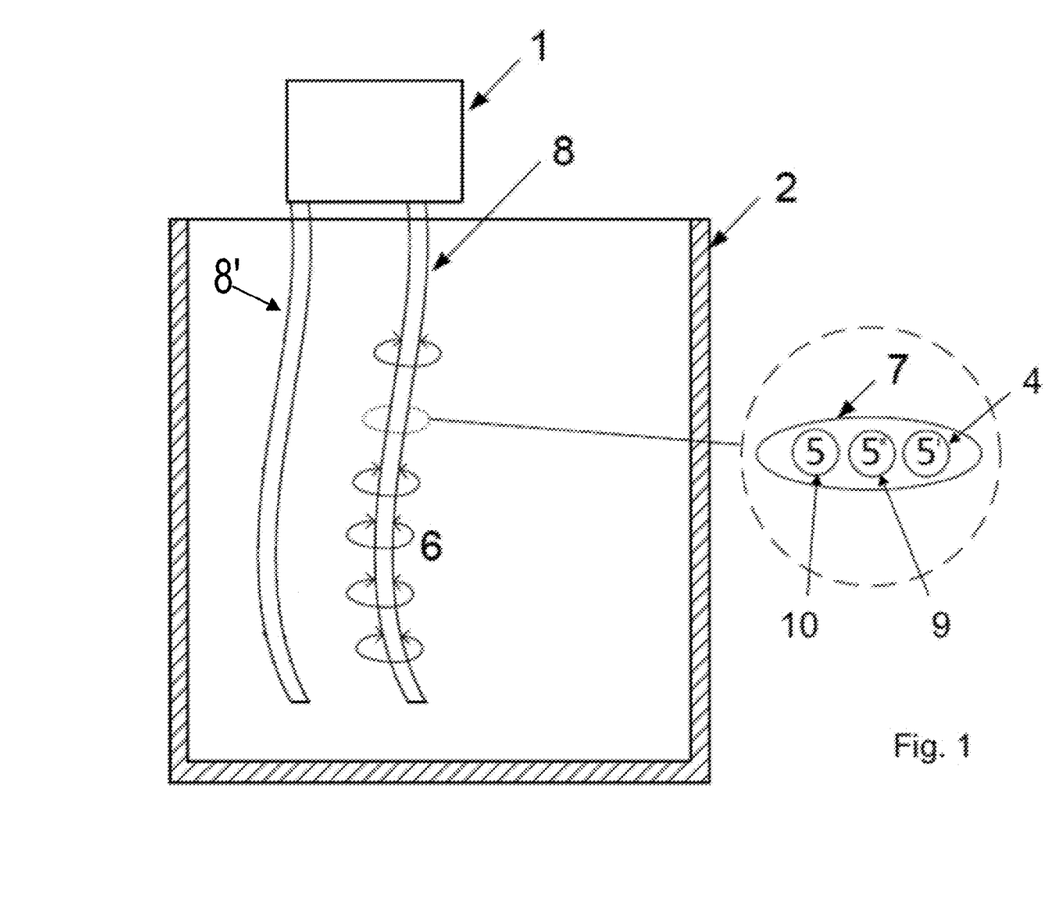
FIG. 1 shows a schematic cross-section through a container, the fill level of which with liquids or bulk materials is determined, according to one embodiment of the invention, in a first measuring mode, wherein the container has a conductive container wall and there is no galvanic connection between the measuring electronics and the conductive container wall, or wherein the container has a non-conductive container wall.

In the preferred embodiments of the invention according to the FIGS. 1, 2*a* and 2*b*, a measuring sensor of measuring device according to the invention comprises at least three electrodes 5, 5', 5" that are insulated from each other, have preferably the same length, are led parallel to one another, are in each case equidistantly spaced apart from one another, are arranged next to one another and have in particular a sheathing as insulation 7.

It is to be noted here that the invention advantageously prefers the use of flexible or rigid measuring sensors which preferably can also be attached to flexible or rigid bodies and can be integrated in particular in other electrically insulating bodies such as probe sleeves or guide rails, and can be led, for example, on or within insulation bodies such as, e.g., plastic tubes or plastic holders.

According to the preferred embodiments of the device according to the invention according to the FIG. 1, a middle electrode 5" is preferably located between the outer electrodes 5, 5', so that by applying a suitable electrical potential 9, a shielding effect is enabled between the outer electrodes 5 and 5'.

Optimal measuring results can be achieved in particular with band-shaped or strip-shaped electrodes. The strip width of the electrodes 5, 5', 5", 5''', 5'''' can be the same for all electrodes. However, the shielding effect between the outer electrodes 5 and 5' can preferably be improved by a larger strip width of the inner electrode 5".

The FIGS. 1, 2a and 2b show the two preferred measuring modes of the method according to the invention, wherein the device according to the invention can be operated in at least one first or in at least one second measuring mode, and wherein in a particularly preferred embodiment of the invention, the device can optionally be switched between these two measuring modes.

If there is no galvanic connection, thus neither between the container 2 and the measuring electronics 1 nor between an auxiliary electrode 2b arranged within the container 2 or on the outside on the container wall and the measuring electronics 1, as shown in the exemplary embodiment according to FIG. 1, the method according to the invention and the device according to the invention are operated in the first measuring mode.

In this first measuring mode according to FIG. 1, in which in each case different potentials are applied to the at least three electrodes 5, 5', 5" of the measuring sensor 8, a first potential 10 is applied to the first electrode 5, the second electrode 5' is operated as counter electrode 4 to the first electrode by applying a second potential 4, that is different with respect to the first potential, to the second electrode 5', and a third potential 9, that in turn is different with respect to the first and the second potentials, is applied to the third electrode 5" so that the third electrode 5" can be operated as a guard electrode 9.

Therefore, a measuring field 6 is formed around the measuring sensor 8 and over the entire length thereof so that in the case of sufficient distance from a conductive container wall 2, the latter has no influence. Moreover, a measurement in non-conductive containers 2 can also be carried out with the measuring device according to the invention.

FIG. 2a shows a second measuring mode in which the method according to the invention and the device according to the invention can be operated, and in which a galvanic connection 3 between the measuring electronics 1 and a conductive container wall of the container 2 is established.

In this second measuring mode in which a first potential is applied to at least one of the at least three electrodes 5, 5', 5" of the measuring sensor 8, and at least one second potential is applied to the electrically conductive container wall of the container 2, the electrically conductive container wall 2 can be operated as counter electrode 4 to the at least one of the at least three electrodes 5, 5', 5" of the measuring sensor 8 so that a measuring field 6 is formed between the container wall of the container 2 and at least one of the at least three electrodes 5, 5', 5" of the measuring sensor 8.

FIG. 2b shows this second measuring mode in another modified embodiment of the invention in which the method according to the invention and the device according to the invention can be operated, in which a galvanic connection 3 is established between the measuring electronics 1 and a separate auxiliary electrode 2b.

In this second measuring mode in which at least one first potential is applied to at least one of the at least three electrodes 5, 5', 5" of the measuring sensor 8, and at least one second potential is applied to the auxiliary electrode 2b that is arranged according to FIG. 2b within the container 2 and separate from the measuring sensor 8, no galvanic connection 3 is formed between the measuring electronics 1 and a container wall 2. In this case, the separate auxiliary electrode 2b represents the counter electrode to the at least one of the at least three electrodes 5, 5', 5" of the measuring sensor 8 when carrying out the fill level measurement.

In a preferred embodiment of the method according to the invention for capacitive fill level measurement, the measuring device can optionally be operated either in the first or in the second measuring mode. Switching between the measuring modes thus requires, if necessary, a possibility of changing the electrode potentials and is preferably done either by changing the measuring sensor contact at the measuring electrics 1, wherein advantageously in each case predefined potentials are applied to the different measuring sensor contacts, or by a switching mechanism, in particular as part of the measuring electronics 1, which is not illustrated in detail in the Figures, which therefore is advantageously able to apply different potentials, preferably selectable, to the measuring sensor contact, in particular even during the operation.

In the second measuring mode according to the embodiment according to FIG. 2a, with the container 2 galvanically connected 3 to the measuring electronics 1, the container thus is used as a counter electrode 4 of the measuring capacitor arrangement. In the second measuring mode according to the embodiment of FIG. 2b, with the container 2 galvanically connected 3 to the separate auxiliary electrode 2b, the auxiliary electrode thus is used as a counter electrode 4 of the measuring capacitor arrangement.

In principal, in these two cases of the second measuring mode, it can already be sufficient in terms of a specific application to use at least one electrode 5, 5', 5" of the multi-electrode measuring sensor 8 as inner measuring electrode 5'.

In another preferred embodiment of the invention, which is not shown in detail in the FIGS. 2a and 2b, a parallel connection of all electrodes 5, 5', 5" involved is implemented. Consequently, the same potential is applied to all electrodes 5, 5', 5". This results in a better measuring effect.

Preferred embodiments of the method according to the invention for capacitive fill level measurement thus provide to apply the same potential optionally to one or to a plurality of electrodes 5, 5', 5" of the measuring sensor 8, wherein this takes place in particular by means of a parallel connection of two or more electrodes.

Here, the parallel connection has a positive effect. The diameter of the inner measuring electrode of the measuring capacitor arrangement has a significant influence on the formation of the measuring field. The smaller the diameter, the higher is the field strength on the measuring sensor surface, and vice versa. In the case of inhomogeneous filling materials such as coarse-grained bulk materials, averaging that is good enough requires a lower field strength, thus a larger electrode diameter. Due to the possibility of connecting two up all individual electrodes of a measuring sensor in parallel, adapting to the properties of the filling material is possible.

Figure 3A:
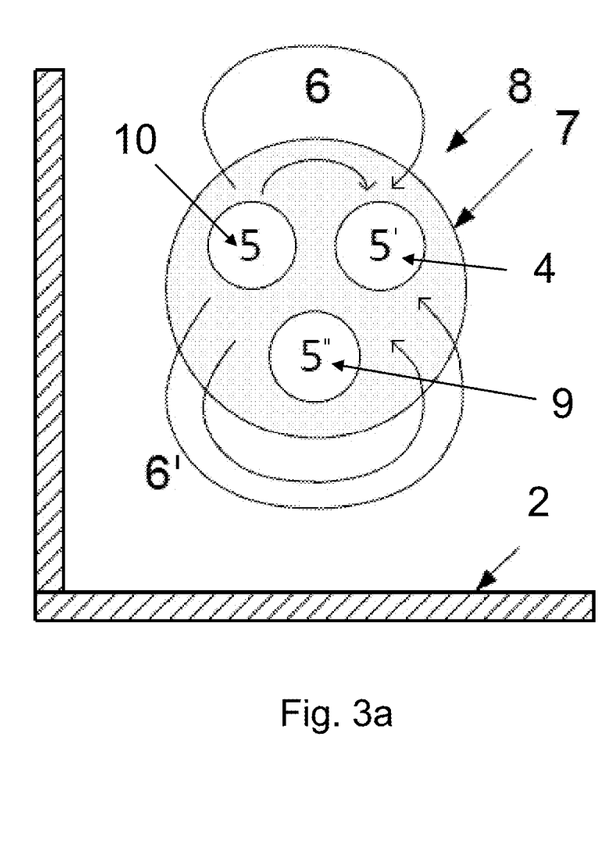
Figure 3B:
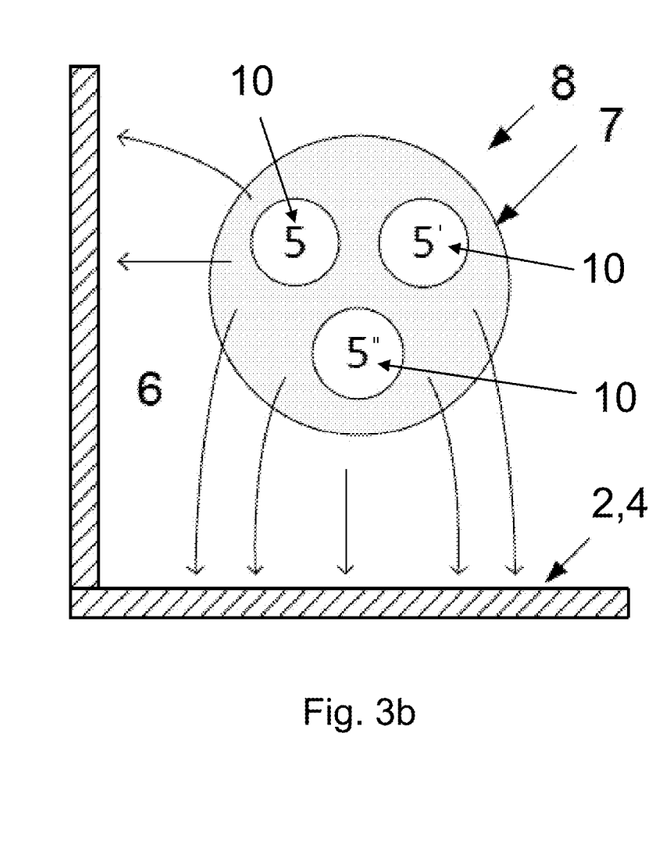

The FIGS. 3a and 3b show a preferred embodiment of the invention for capacitive fill level measurement as a sectional view through a three-core cable that is formed as a measuring sensor 8 and has a sheathing 7 as insulation.

When using the first measuring mode in a preferred embodiment of the method according to the invention, according to FIG. 3a, preferably two cores of a cable that are formed as electrodes 5 and 5' are used as measuring electrodes with the potential 10, 4, and a shielding potential 9 is applied to the third electrode 5" as the guard electrode 9.

The measuring sensor 8 of FIG. 3a, which is formed according to a corresponding measuring device according to the invention, has a geometry that differs from that of the measuring sensor 8 shown in the FIGS. 1, 1a and 2b because the guard electrode 9 is not located between the electrodes 5 and 5, but is arranged offset to them.

Thus, between the electrodes 5 and 5', a measuring capacitor arrangement is formed with a measuring field 6 which, in the upper half of the Figure, is aligned substantially directly between the electrodes 5 and 5', while in the lower half of the Figure, a measuring field 6' is formed between the electrodes 5 and 5' that extends further into the container and is aligned around the guard electrode 9.

When using the second measuring mode in a preferred embodiment of the invention as shown, e.g., in FIG. 3b, all three cores of the cable that are formed as electrodes 5, 5', 5" are connected in parallel, that is, the same potential is applied to these electrodes, wherein a measuring capacitor arrangement with a measuring field 6 is formed between the conductive container wall 2 as the counter electrode 4 and the electrodes 5, 5', 5" that are connected in parallel.

However, it is to be noted that less or more than three electrodes 5, 5', 5" can also be connected in parallel.

The FIGS. 4a and 4b show preferred embodiments of the invention for capacitive fill level measurement in a greatly simplified sectional view through a four-core cable that is formed as a measuring sensor 8 and has a sheathing 7 as insulation.

When using the first measuring mode in another preferred method according to the invention, according to FIG. 4a, two opposing cores of a cable that are formed as measuring electrodes 5 and 5' with the potentials 10, 4 are used, and a shielding potential 9 is applied to a third electrode 5" and a fourth electrode 5'" as guard electrodes 9.

The corresponding preferred embodiment of the measuring device according to the invention of FIG. 4a thus forms a measuring sensor 8 that has a geometry that differs from that of the measuring sensor 8 shown in the FIG. 3a because both guard electrodes 9 are located between the electrodes 5 and 5', or are in each case arranged slightly offset to them. Thus, between the electrodes 5 and 5', a measuring capacitor arrangement is formed with a measuring field 6 and 6' which is not aligned directly between the electrodes 5 and 5', but is aligned symmetrically around the guard electrodes 9 on two opposite sides of the measuring sensor 8, and extends far into the container on these two sides.

When using the second measuring mode in a preferred embodiment of the method according to the invention, as shown in FIG. 4b, all four electrodes 5, 5', 5", 5'", which, e.g., correspond to 4 cores of a cable, are connected in parallel. Consequently, the same potential is applied to them, wherein a measuring capacitor arrangement is formed between the conductive container wall 2 as the counter electrode 4 and the electrodes 5, 5', 5", 5'" that are connected in parallel.

However, it is to be noted that less or more than four electrodes 5, 5', 5", 5'" can also be connected in parallel.

Figure 5B:
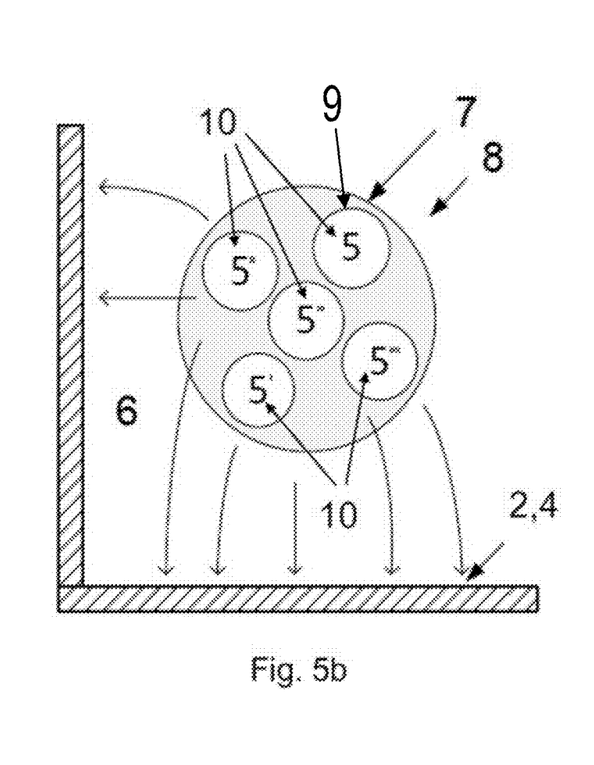

The FIGS. 5a and 5b show a preferred embodiment of the device according to the invention for capacitive fill level measurement in a schematic partial sectional view through a five-core cable that is formed as a measuring sensor 8 and has a sheathing 7 as insulation.

When using the first measuring mode in another preferred embodiment of the invention according to FIG. 5a, e.g., two opposing cores of a cable that are formed as electrodes 5 and 5' are used as measuring electrodes with the potentials 10, 4, and a shielding potential 9 is applied to a third electrode 5", a fourth electrode 5'" and a fifth electrode 5"" as guard electrodes 9.

The corresponding preferred embodiment of the measuring device according to the invention forms a measuring sensor 8 and, as shown in the FIG. 5a, thus has a geometry that differs from that of the measuring sensors 8 shown in the FIGS. 3a and 4a because only one guard electrode 9 is located between the electrodes 5 and 5', and the other electrodes 5" and 5'" formed as guard electrodes 9 are in each case arranged offset to them.

Thus, between the electrodes 5 and 5', a measuring capacitor arrangement is formed with a measuring field 6 and 6' which, according to the FIG. 5a, is not aligned directly between the electrodes 5 and 5', but is aligned and formed symmetrically around the shielding electrodes 9 on two opposite sides of the measuring sensor 8.

When using the second measuring mode according to a preferred embodiment of the method according to the invention, e.g., as shown in FIG. 5b, all five cores of the cable that are formed as electrodes 5, 5', 5", 5'", 5"" can preferably be connected in parallel, that is, the same potential is applied to these cores, wherein a measuring capacitor arrangement is formed between a conductive container wall 2 as the counter electrode 4 and the electrodes 5, 5', 5", 5'", 5"" that are connected in parallel.

However, it is to be noted that less than five or any number of more than five electrodes 5, 5', 5", 5'", 5"" can also be connected in parallel.

The described embodiments of the invention therefore show that by using measuring sensors having a greater number of electrodes, e.g., having a number of n electrodes, e.g., by means of an n-core cable, better shielding properties and/or increased directivity for the electrical measuring fields 6, 6' can be achieved compared to measuring sensors having a greater number of electrodes, e.g., having a number of (n–x) electrodes, e.g., by means of an (n–x)-core cable, wherein x is less than n. In this respect it is furthermore advantageous to use a greater number of wires or cores, with adequate mechanical properties, since the cable flexibility also increases.

It is further to be noted that according to a preferred embodiment of the device according to the invention having a number of n electrodes, e.g., by means of an n-core cable, a multiplicity of wiring variants is possible. In the same manner as in the case of the above-described cable types, it is possible in the case of the second measuring mode that at least one, preferably, e.g., all n cores are connected in parallel as measuring electrodes and that by using a conductive container wall 2 as a counter electrode 4, a measuring capacitor arrangement can be implemented. In the case of the first measuring mode, at least two outer cores can be used as measuring electrodes 5, 5 and 5', and a shielding potential 9 can be applied to at least one, but preferably to a plurality of electrodes 5", 5'", 5"".

Moreover, in another embodiment of the invention, outer measuring electrodes 5, 5' and further measuring electrodes can also be connected in parallel, that is, the same potential can be applied to them in order to increase the electrically effective diameter of the measuring electrodes of the measuring sensor 8.

Furthermore, in a preferred embodiment of the invention, it is also possible for all embodiments that in addition to the measuring sensor 8, optionally one or more further identical or different measuring sensors 8' are inserted into the container, are connected to the measuring electronics 1 and are operated by the latter.

In the case of the second measuring mode and another preferred embodiment of the method according to the invention (not shown in the Figures) it is also possible, in particular optionally, that the measuring field 6 is aligned by a one-sided shielding of at least one of the at least three electrodes 5, 5', 5", 5'", 5"" of the measuring sensor 8. For such a one-sided shielding it is also possible, e.g., to modify the embodiment according to FIG. 5b to that effect that the electrodes 5', 5", 5'", 5"" are operated as guard electrodes 9 and the electrode 5 is connected as measuring electrode.

The method according to the invention and the device according to the invention allow furthermore to use in particular flexible, rigid, wire-shaped or strip-shaped measuring sensors 8 which preferably can be attached to flexible or rigid bodies and are in particular integrated in electrically insulating bodies such as probe sleeves or guide rails, and are led, for example, on or within of insulation bodies such as, e.g., plastic tubes or plastic holders. If preferred customary multi-core cables are used as measuring sensors, it is to be noted that the usual twisting of the individual cores of these cables has no significant influence on the measuring behavior of the measuring device according to the invention.

However, it is also to be noted that the above-mentioned variant with directivity cannot be implemented with twisted cables. Consequently, in a preferred embodiment of the invention, non-twisted cables are used for measuring devices with direction-dependent measuring sensitivity, wherein directivity is achieved by suitable asymmetrical parallel connection of individual cores.

In principle, many cross-sectional shapes for the electrodes 5, 5', 5", 5'", 5"" are possible for carrying out the invention. For particular requirements, special cables with differently formed individual electrodes can be used. It is particularly preferred here to use band-shaped or strip-shaped electrodes due to their larger surfaces.

Furthermore, electrodes 5, 5', 5", 5'", 5"" of a preferred embodiment of the device according to the invention for capacitive fill level measurement which are arranged in measuring sensors 8 form a bond with insulation materials so that during the fill level measurement of liquids and/or bulk materials, these electrodes are chemically resistant to these liquids and/or bulk materials and/or ensure abrasion resistance and tensile strength.

A possible electronic evaluation by the measuring electronics 1 of the electrical primary signals obtained according to the invention is known from DE 1275777, for example.

Furthermore, further preferred refinements provide that the device according to the invention for capacitive fill level measurement is designed for the purpose of enabling the recovery of at least one limit value switching signal, at least one analogue fill level signal or, at the same time, a combination of analogue fill level signals and limit value signals.

In this respect, reference is made in particular to the European Application EP 12007966.0 with the title "Verfahren and Vorrichtung zur kapazitiven Füllstandsmessung mit Kabelsonde oder Stabsonde" filed on 27 Nov. 2012 by the same applicant, the content of which is hereby incorporated in this application and according to which devices and methods for capacitive fill level measurement are described, comprising a fill level probe that can be formed as a cable probe or also as a rod probe so as to carry out fill level measurements and in particular also analogue fill level measurements and/or combined analogue/limit value fill level measurements for liquids and bulk materials in a container which can be both conductive and non-conductive.

Here, for measuring the fill level, the fill level probe is inserted substantially vertically into the container and thus extends vertically into the container, wherein by at least one first electrode arrangement formed on the fill level probe, a measuring section is defined, and on at least one end of this measuring section, an additional second electrode arrangement is geometrically formed by which at least one endpoint for a measuring field boundary and therefore a material-independent detectability of this at least one endpoint is effected. Each such endpoint can be used for compensating the systematic distortion caused by the changes in permittivity of the fill material so that therefore material-independent analogue signals for measuring sections of any size can be obtained. Here, analogue filling level measurements can be performed with a reference point or endpoint that is independent of the permittivity of the fill material, one or more overfill signals that are independent of the permittivity of the fill material can be made available during the analogue measurement and independent thereof, and/or automatic recalibrations of an endpoint of the analogue measurement can be performed in the case of changes in permittivity of the fill material.

REFERENCE LIST

1 Measuring electronics
2 Container, container wall
2b Auxiliary electrode
3 Galvanic connection between measuring electronics and container/auxiliary electrode
4 Electrode(s) operated as counter electrode(s), potential of the counter electrode(s)
5 Electrode
5' Electrode
5" Electrode
5'" Electrode
5"" Electrode
6 Electrical measuring field
6' Electrical measuring field
7 Insulation
8 Measuring sensor
9 Electrode(s) operated as guard electrode(s), potential of the guard electrode(s)
10 Electrode(s) operated as measuring electrode, potential of the measuring electrode(s)

What is claimed is:

1. A method for capacitive fill level measurement of liquids and/or bulk materials in a container using at least one measuring sensor that is connected to measuring electronics,
   wherein the measuring sensor is constructed from a plurality of, at least three, electrodes which are electrically insulated from one another and which, for measuring the fill level, are inserted into the container, and in the inserted state extend into the container, and
   wherein these at least three electrodes are connected to the measuring electronics and are adapted to selectively operate in a first measuring mode and a second measuring mode,
   wherein:
   (a) in the first measuring mode, in each case, different potentials are applied to the at least three electrodes of the measuring sensor, wherein a first potential is applied to a first electrode, a second potential that is different with respect to the first potential is applied to a second electrode, and the second electrode is operated as a counter electrode to the first electrode, and a third potential that is different with respect to the first and the second potentials is applied to the third electrode, and the third electrode is operated as a guard electrode; and (b) in the second measuring mode, a first potential is applied to at least one of the at least three electrodes of the measuring sensor, and at least one second potential that is different with respect to the first potential is applied to either an electrically conductive container wall, wherein the measuring electronics and the electrically conductive container wall are galvanically connected to one another, and the electrically conductive container wall is operated as a counter electrode to the at least one electrode of the measuring sensor to which the first potential is applied, or to an auxiliary electrode that is separate from the measuring sensor and is arranged within the container or on the outside on the container wall, wherein the measuring electronics and the auxiliary electrode are galvanically connected to one another, and the auxiliary electrode is operated as a counter electrode to the at least one electrode of the measuring sensor to which the first potential is applied, wherein selecting one of the first and second measuring modes takes place by switching between the first and second measuring modes by a switching mechanism.

2. The method according to claim 1, wherein a same potential is selectively applied to one or to a plurality of the at least three electrodes of the measuring sensor.

3. The method for capacitive fill level measurement according to claim 1, characterized in that in addition to the measuring sensor, selectively one or a plurality of further identical or different measuring sensors are inserted into the container, are connected to the measuring electronics and operated.

4. The method for capacitive fill level measurement according to claim 1, characterized in that in the case of the second measuring mode, the measuring field is aligned for at least one of the at least three electrodes of the measuring sensor by a one-sided shielding in the form of a plurality of electrodes that are operated as guard electrodes.

5. A device for capacitive fill level measurement of liquids and/or bulk materials in a container using at least one measuring sensor according to claim 1 which can be connected to measuring electronics, wherein the measuring electronics provides at least three different potentials and the measuring sensor is formed from at least three electrodes which are electrically insulated from one another and which, for measuring the filling level in the container, are to be inserted into the container and extend in the inserted state into the container, and the device is adapted to selectively operate in a first measuring mode and a second measuring mode, wherein these at least three electrodes can be connected to the measuring electronics in such a manner that:

(a) in the first measuring mode, in each case three different potentials are applied to the at least three electrodes of the measuring sensor, wherein a first potential is applied to a first electrode, a second potential that is different with respect to the first potential is applied to a second electrode so as to operate the second electrode as a counter electrode to the first electrode, and a third potential that is different with respect to the first and the second potentials is applied to the third electrode so as to operate the third electrode as a guard electrode;

(b) in the second measuring mode, a first potential is applied to at least one of the at least three electrodes of the measuring sensor, and at least one second potential that is different with respect to the first potential is applied to either an electrically conductive container wall, wherein the measuring electronics and the electrically conductive container wall are galvanically connected to one another so as to operate the electrically conductive container wall as a counter electrode to the at least one electrode of the measuring sensor to which the first potential is applied, or to an auxiliary electrode that is separate from the measuring sensor and is arranged within the container or on the outside on the container wall, wherein the measuring electronics and the auxiliary electrode are galvanically connected to one another so as to operate the auxiliary electrode as a counter electrode to the at least one electrode of the measuring sensor to which the first potential is applied, wherein the device comprises a switching mechanism for selecting one of the first and second measuring modes and for switching between the first and second measuring modes.

6. The device for capacitive fill level measurement according to claim 5, wherein the device is designed to apply the same potential selectively to one or to a plurality of the at least three electrodes of the measuring sensor.

7. The device for capacitive fill level measurement according to claim 5, wherein the at least three electrodes of the measuring sensor are formed to be at least one of the following: to be rigid, flexible, wire-shaped, strip-shaped, in a mechanical bond, and in multi-core cables.

8. The device for capacitive fill level measurement according to claim 5, wherein the at least three electrodes of the measuring sensor in the container are led parallel to one another or have distances from one another that are constant at least in certain sections.

9. The device for capacitive fill level measurement according to claim 5, characterized in that in addition to the measuring sensor, selectively one or a plurality of further identical or different measuring sensors can be inserted into the container and can be connected to the measuring electronics and operated.

10. The device for capacitive fill level measurement according to claim 5, characterized in that the at least three electrodes arranged in the measuring sensors form a bond together with insulation materials which, during the fill level measurement of liquids and/or bulk materials, are chemically resistant to said liquids and/or bulk materials, and/or ensure abrasion resistance and tensile strength.

11. The device for capacitive fill level measurement according to claim 5, characterized in that the device is designed so as to enable the recovery of at least one limit value switching signal, at least one analogue fill level signal, or, at the same time, a combination of analogue fill level signals and limit value signals.

* * * * *